United States Patent
Santos

(10) Patent No.: US 10,739,799 B2
(45) Date of Patent: Aug. 11, 2020

(54) METHOD AND SYSTEM FOR VOLTAGE REGULATION, CONTROL, PROTECTION AND MONITORING OF STATE OF ON-LOAD TAP CHANGERS OF POWER TRANSFORMERS, VOLTAGE REGULATORS, AND CAPACITOR BANKS

(71) Applicant: Eduardo Pedrosa Santos, Atibaia (BR)

(72) Inventor: Eduardo Pedrosa Santos, Atibaia (BR)

( * ) Notice: Subject to any disclaimer, the term of this patent is extended or adjusted under 35 U.S.C. 154(b) by 0 days.

(21) Appl. No.: 15/004,890

(22) Filed: Jan. 22, 2016

(65) Prior Publication Data
US 2016/0147237 A1 May 26, 2016

Related U.S. Application Data

(63) Continuation of application No. 12/279,597, filed as application No. PCT/BR2006/000265 on Dec. 7, 2006, now abandoned.

(30) Foreign Application Priority Data

Feb. 2, 2006 (BR) ...................................... 0601093

(51) Int. Cl.
G05F 1/14 (2006.01)
G05F 1/147 (2006.01)
H02J 3/18 (2006.01)
H02M 3/335 (2006.01)

(52) U.S. Cl.
CPC ................ *G05F 1/147* (2013.01); *G05F 1/14* (2013.01); *H02J 3/1878* (2013.01); *H02M 3/33507* (2013.01); *Y02E 40/30* (2013.01)

(58) Field of Classification Search
None
See application file for complete search history.

(56) References Cited

U.S. PATENT DOCUMENTS 4,419,619 A   12/1983   Jindrick et al.
4,837,627 A * 6/1989   Mengel .................... H04N 5/44
                                                 348/731

(Continued)

FOREIGN PATENT DOCUMENTS

WO    93/22717      11/1993
WO    2005/026860 A2   3/2005

OTHER PUBLICATIONS

Santos Eduardo Pedrosa, PCT/BR2006/000265 filed Dec. 7, 2006, "International Search Report".

*Primary Examiner* — Jeffrey A Gblende
(74) *Attorney, Agent, or Firm* — McKee, Voorhees & Sease, PLC

(57) ABSTRACT

A method for voltage regulation, control, protection and monitoring of state of on-load tap changers of power transformers, voltage regulators, and capacitor banks comprising: uses a voltage regulation system that has sets of voltage regulation parameters available for programming by a user. Each of these sets is adjustable in an independent manner for a given prevailing load condition. The parameters include a desired rated voltage at a load: a voltage variance percentage allowed over and below rated voltage; time delay adjustments for CDC (15) actuation in order to correct voltage; choice of linear or reverse time delay type; and parameters referring to voltage drop in the line.

7 Claims, 4 Drawing Sheets

(56) References Cited

U.S. PATENT DOCUMENTS

| | | | |
|---|---|---|---|
| 5,450,002 A * | 9/1995 | Dunk | G05F 1/153 |
| | | | 323/255 |
| 5,541,498 A | 7/1996 | Beckwith | |
| 5,568,398 A | 10/1996 | Trainor | |
| 5,602,462 A * | 2/1997 | Stich | G05F 1/147 |
| | | | 307/64 |
| 5,619,121 A | 4/1997 | Trainor | |
| 5,804,954 A | 9/1998 | Laplace, Jr. | |
| 5,999,430 A * | 12/1999 | Aritsuka | H02J 3/1842 |
| | | | 363/95 |
| 6,100,674 A | 8/2000 | Dohnal et al. | |
| 7,358,794 B2 * | 4/2008 | Kawagoshi | H02M 3/073 |
| | | | 327/537 |
| 7,417,411 B2 | 8/2008 | Hoffman et al. | |
| 2003/0114899 A1 * | 6/2003 | Woods | A61N 1/36071 |
| | | | 607/60 |
| 2005/0104567 A1 | 5/2005 | Beckwith | |

* cited by examiner

FIGURE 4

| Variables for recording | Recording Mode | | | | |
|---|---|---|---|---|---|
| | Instantaneous | Average | Root mean square | Maximum | Minimum |
| Measured voltage | ✓ | | ✓ | | |
| Load voltage | ✓ | | | ✓ | ✓ |
| Load current | | | ✓ | ✓ | ✓ |
| CDC tap position | ✓ | | | ✓ | ✓ |
| Active power | ✓ | ✓ | | ✓ | ✓ |
| Reactive power | ✓ | ✓ | | ✓ | ✓ |
| Power factor | ✓ | ✓ | ✓ | | |
| Etc. | ✓ | | | | |

METHOD AND SYSTEM FOR VOLTAGE REGULATION, CONTROL, PROTECTION AND MONITORING OF STATE OF ON-LOAD TAP CHANGERS OF POWER TRANSFORMERS, VOLTAGE REGULATORS, AND CAPACITOR BANKS

CROSS REFERENCE TO RELATED APPLICATIONS

This application is a continuation of U.S. application Ser. No. 12/279,597, filed Aug. 15, 2008, which is a National Phase of PCT/BR2006/000265, filed Dec. 7, 2006, which is based on Brazilian Application No. PI 0601093-8, filed Feb. 2, 2006, all of which are herein incorporated by reference in their entireties.

FIELD OF THE INVENTION

This invention relates to a "SYSTEM FOR VOLTAGE REGULATION, CONTROL, PROTECTION AND MONITORING OF STATE OF CHANGERS UNDER POWER TRANSFORMER LOAD, VOLTAGE REGULATORS, CAPACITOR BANKS AND SIMILAR" including a voltage regulation system, provided with innovative functions and features that enable making up for deficiencies of currently used voltage relays, by preserving unbiased treatment to consumers, residential or business irrespective of demand curve variations.

BACKGROUND OF THE INVENTION

Power transformers and autotransformers and voltage regulators are used in an electric power generation, transmission and distribution system for power transfer, normally changing the output voltage value in relation to input. In order to allow controlling voltage supplied to load, its windings are equipped with taps which are connected to a CDC (Comutador de derivação em carga, hereinafter referred to by the English language equivalent, OLTC (On-Load Tap Changer)), which makes TAP change used with the energized transformer and with connected load, changing the coil ratio and consequently transformer output voltage.

In order to make the change and tap change the OLTC has a motorized drive mechanism and regulated by signals received in its inputs, to raise or lower the tap.

Currently in order to allow automatic voltage regulation supplied to load, transformers are equipped with a device called automatic voltage regulator relay, or voltage relay or simply relay, which send to the changer under load signals to lower or raise the tap position, so as to keep voltage in the load within programmed limits in relay parameterization.

In order to perform the automatic voltage regulation function, the voltage relays perform the transformer output voltage measuring through a power transformer (PT) and, the load current through a current transformer (CT). With these measurements, the voltage relay makes calculation of the voltage that actually reaches the load, by taking into consideration voltage drop in the transmission line, proportionate to the load current. Calculated voltage in load is then compared to a set of regulation parameters programmed in the voltage relay in order to determinate when there is need for change in OLTC tap. Said parameters include:

Rated voltage in load;
Tolerance margin, which is the allowed voltage percentage over and under rated voltage;

Timing for OLTC actuating in order to correct voltage, so as to avoid unnecessary tap change as a result of temporary voltage deviations, in which actuating time can be constant—regardless of the voltage deviation magnitude in relation to programmed tolerance margin (linear timing); or inversely proportional to voltage deviation magnitude in relation to tolerance margin (inverted timing); and Parameters referring to voltage drop in line in a given load current condition (rated current), allowing the voltage relay to calculate actual voltage reaching the load.

Generally current voltage relays also have an input for making OLTC tap position measurement, through a position sensor existing in it. Measured tap position is then indicated to operator who may also perform OLTC command in manual manner, by blocking automatic voltage regulation commands. Based on this OLTC tap position measurements, some existing voltage relays also perform OLTC control in transformers electrically connected in parallel, therefore using the concept called Master-Command or Master-Follower. In this concept, one of the transformers in parallel is selected in master mode and the other in commanded mode. Every tap change performed by the master must be repeated by followers that lose their command independence to simply obey master transformer tap changes. In this way, all transformers will be in the same tap position, which prevents current circulation among windings in parallel, sending new trap change commands is blocked, preventing tap difference between transformers from increasing. 14) In operation in parallel of transformer banks consisting of individual single-phase transformers, additional care must be taken in order to ensure that the three single-phase transformers of which a bank consists are with their OLTCs in the same tap position, in order to prevent a voltage unbalance between the three-phase system phases. To this end a synchronism, check is performed between tap positions of the three single-phase transformers of the same bank, blocking OLTC operation and issuing an alarm is any tap discrepancy occurs between the bank phases. For maintenance and testing purposes only, when the bank is not electrically connected in parallel to others, is when OLTCs of each phase can be operated in different tap positions. In order to allow these tests and maintenances in existing system will have a selection, manually performed by the operator, where it is indicated whether the three transformers of the same bank must operate in the same tap position ("bank" mode) or in individual manner ("individual phase" mode).

State of the Art Disadvantages

One of the limitations of existing voltage relays is related to transformers serving consumers in different load profiles, such as residential, business and industrial consumers. In these cases there may be prevalence of a certain type of consumer on certain weekdays or times and, of another type of consumer in other periods of the week. In this way, ideal parameter settings for a type of consumer may be totally unsuitable for another type of consumer. With currently available voltage relays there is no satisfactory solution for this occurrence, forcing the operator to favor a certain type of consumer in detriment of another or, then make periodic manual changes to the voltage relay parameter settings.

In conventional voltage relays used in transformers, one of the programmed parameters for making the voltage regulation is to delay OLTC operation in order to correct voltage that, has as a function preventing unnecessary tap changes is important due to the fact that the OLTC is the equipment that generates the highest maintenance costs in transformers and, the need for maintenance in the CD is basically determined by the number of trap changes made. Accordingly, in order to reduce the changer maintenance costs the ideal is to make the highest possible timing adjustment. On the other hand, maximum times that loads may remain in voltages over or below tolerance limits are often determined by the electric sector regulatory agencies that, may establish different times for voltage below or over tolerance. In this context, conventional voltage relays are fitted with a single timing adjustment used both when there is need to increase voltage and when it is necessary to decrease voltage. This fact forces the operator to adjust timing according to the shortest time defined by regulatory agencies (between allowed times for a voltage below or over tolerance), which results in additional OLTC actuations in a condition that a longer operation time would be allowed.

In currently used voltage relays in transformers, when voltage in the lead exceeds lower and upper limits defined by programmed tolerance margin timing count is started for OLTC operation. Said timing may be a linear type, in which actuation time is constant, regardless of the voltage deviation magnitude in relation to programmed tolerance margin, or reverse type timing, in which actuation time is inversely proportional to voltage deviation magnitude in relation to the tolerance margin. As already mentioned, timing settings are based on maximum times in which loads may remain with voltages over or below tolerance limits, and said times are often determined by the electric sector regulatory agencies, which, generally, determine shorter times as voltage deviation increases over or below allowed tolerance limit. Accordingly, conventional relays have as the only feature meeting the needs of shorter timings for higher voltage deviations than reverse timing. This forces the operator to adjust timing in order to meet or exceed arbitrarily defined times by the regulatory agency, which usually tends to cause unnecessary additional OLTC actuations when adjustment made takes a shorter actuation time than required by the regulatory agency.

On-Load Tap Changers (OLTC) are equipped with a motorized drive mechanism that receives command signals to increase or decrease the tap position. Such drive has intern ally several control elements, such as, relays, mechanically driven end of line switches, among so many other elements. Certain failures in referred control elements can lead the OLTC to make unsolicited tap changes, which may be repeated in successive manner leading the OLTC to reach an extreme upper or lower position, causing either too high or too voltage values in the load. The occurrence of this type of occurrence is highly undesirable by consequences that may be, for example, load shutoff by its protection actuation or even damages in loads.

Following the same above-mentioned context, of the Changers (OLTCs) motorized drive mechanism, certain failures may lead the OLTC not to make requested tap changes by the voltage regulation system, which may lead voltage in the load to slowly vary as load current and primary voltage in transformer are changed. After some time, voltage in load may reach very high or very low due to lack of voltage correction that would be provided by OLTC operation, with consequences that may go from load shutoff by actuation of its protections or even damages in load. Accordingly, in conventional relays, inoperative OLTC condition is only perceived after some time, when voltage reaches too high or too values, already with damage to the load.

Several researches conducted around the world referring to failures and stoppages for maintenance in transforms clearly signal that the OLTC is the equipment that generates the highest failures rates and maintenance costs in transformers, the need for maintenance in the OLTC being basically determined by the number of tap changes made by it. Currently, OLTCs are equipped with mechanical operation counters that record the number of tap changes made since the equipment operation start, control of this number of operations being made by maintenance personnel, which in a certain frequency moves to the OLTC and writes down the number of operations at that time. With this information inspection and/or maintenance need is determined in the OLTC, having as a parameter the number of operations since the last inspection/maintenance if the value recommended by manufacturer is reached.

Following above-commented research, in relation to OLTCs, the need for maintenance in the latter is also determined by the wear and tear of contacts that make electric arc interruption during tap change. As is known by technicians in the matter, the wear of said contacts is proportional to the sum of interrupted current squares. Currently, maintenance in OLTCs is focused on their number of operations, which opens the possibility of problems appearing in OLTCs, if interrupted currents by their contacts have sufficient intensity to cause excessive contact wear, anticipating the number of operations predicted for maintenance. Additionally, maintenances simply based on OLTC operations, statistically reveal that maintenance could have been postponed for some time, taking into account that changer contacts are found in good state.

In conventional relays in which operations control is done in parallel of transformers by the Master-Commanded method it is necessary to select for each transformer its function in master parallelism control, commanded or further individual (if transformer is not operating in parallel with any other). Bu the Master-Commanded concept, only one of transformers can be selected as master and there may not be transformers selected as Commanded if there is no Master transformer. This enables making invalid configurations for parallelism control in existing voltage relays, such as, for example, the selection of more than one transformer as master or selection of transformers as commanded without the existence of a master.

In existing voltage relays where operation control is made in parallel of transformers by the Master-Commanded method, the voltage relay makes synchronism verification taps of transformers in parallel, blocking OLTC operation and issuing an alarm if there is tap discrepancy. However, in the condition in which transformers are not in parallel and, therefore are selected for operating in individual mode, there is no obligation for their tap positions to be equal. However, at any time it may be necessary for said transformers having to be operated in parallel and, to this end of them will have to be selected as mater and the others as commanded. It may occur that master-commanded selections will be made with transformer OLTCs in different tap positions, which will lead the voltage relay to issue a tap discrepancy alarm between OLTCs.

For two or more transformers to be electrically connected in parallel it is necessary for their OLTCs to be in the same tap position, so as to prevent current circulation among windings. Establishing the electric connection of transformer windings in parallel is usually done by closing a substation circuit breaker that can only be closed after transformer OLTCs are in the same tap position. Currently this verification is manually made by the operator, therefore, being subject to human failure.

In conventional relays where operation control in parallel of transformer banks consisting of single-phase transformers is done, it is necessary to ensure, during normal operation, that the three single-phase transformers of which a bank consists are with their OLTCs in the same tap position. However, in order to allow testing and maintenances existing systems have a selection where it is indicated whether the three transformers of the same bank should operate in the same tap position ("bank" mode) or in individual manner ("individual phase" mode). This selection is made manually, which opens the possibility for an operator error, which may select the transformer OLTC of each phase to operate in individual manner, and consequently in different tap position from the other phases, even if the transformer bank is in normal operation electrically connected in parallel to other banks.

In existing systems where operation control in parallel of transformer banks consisting of single-phase transformers is done, a synchronism checking is made between tap positions of the three single-phase transformers of the same bank, blocking OLTC operation and issuing an alarm if a tap discrepancy occurs between the bank phases. However, in the condition that the bank is in maintenance and its phases are in "individual phase" mode, there is no obligation for their tap positions to be equal. At any time, however, it may be required for the bank to return to operate normally, and to this end the phases should be changed to "bank" mode. This opens the possibility for phase selections to "bank:" mode to be made with the three phases of transformers in different tap positions, which will lead voltage relay to issue a tap discrepancy alarm between OLTCs.

SUMMARY OF THE INVENTION

Thinking about the above-commented inconveniences, the inventor, a person working in the electric power sector, has created the system in question that comes to make more reliable voltage regulation, protection and state if changers under equipment load state monitoring, such as, power transformers and voltage regulators, making up for deficiencies of current relays that perform voltage regulation based on a single set of parameters; the other way about, proposed invention provides pre-programming for different voltage regulation parameter settings, each setting being suitable to a given prevailing load condition, allowing consumer service with different load profiles, having to this end several regulation parameters, adjustable in independent manner.

Furthermore, the proposed system allows selection of the voltage regulation parameter set made by dry contacts where a combination of open and closed contacts is used indicative of the parameter set that must be used in voltage regulation. In continuity, the claimed system allows voltage regulation parameter set selection to be made by daily and hourly programming, in addition to other temporary parameters. Another innovation of the proposed system is the possibility of independent value adjustment of OLTC actuation timing for conditions in which voltage is over or below allowed tolerance margins. Proposed system also allows adjustment of several voltage deviation ranges, different OLTC actuation times being associated with each deviation range. The system also has a mass memory function (non-volatile), where measurement values made by the system are recorded obeying the interval programmed by the operator, having several innovating features. In conformity with the new invention it is possible to block the erroneously tripped OLTC, equally with several features to be discussed later. Such as mentioned above the system has the function of detecting the inoperative OLTC, before voltage reaches extreme values also meeting several features. In this same line, the system proposed herein has the innovating function of OLTC maintenance assistant, with several features oriented toward statistical maintenance control of changers under load. Another new system function is the "Master-Commanded-Individual" smart selection programming, when there is an operation in parallel of several transformers, and "Bank-Individual Phase" smart programming, when using banks consisting of three independent single-phase transformers, preventing several inconveniences of existing systems. At last the proposed system has the synchronism signaling function and correct programming, which automates the tap synchronism checking process when electrically connecting transformers in parallel, which prevents human failures in this checking.

The proposed invention prevents, in proposed voltage regulation system parameterization, the operator from being forced to privilege a certain consumer in detriment of others or then having to make periodical manual changes to voltage relay parameter settings.

Allow that, by means of dry contacts, it will be possible to select a set of voltage regulation parameters, at a distance, by using, for example, selection switches within operator reach in the control room or further output contacts of remote terminal units (RTUs);

By the selection of voltage regulation parameter set through daily and hourly programming, allow the operator to program the voltage regulation system to automatically adapt it to prevailing conditions of load profiles subject to hourly, daily and weekly variations.

By timing setting programming for independent OLTC actuation in the event that voltage is over or below allowed tolerance margins, giving conditions for meeting the regulatory agency requirements in relation to allowed times for voltage off tolerance, at the same time as reducing to the maximum possible the number of OLTC operations, reducing maintenance costs.

By programming settings for several voltage deviation ranges, each associated deviation range being different OLTC actuation times (one time adjustment to increase voltage and one adjustment to reduce voltage), conditions are given for the user to create a customized timing mode, in which operation time diminishes exactly as desired as voltage deviation increases, so as to exactly meet the regulatory agency requirements in relation to allowed times for voltage off tolerance, at the same time as reducing to the maximum possible the number of OLTC operations, reducing maintenance costs.

By the mass memory function, allows the operator to choose for recording in the memory only variables he considers important, avoiding spending memory space with unnecessary variables for their application.

Still by the mass memory function, the operator may choose to record not only the variable instantaneous value, but also minimum, maximum, arithmetic mean or square variable mean values during the time interval since the last made recording. With that it becomes possible to retrieve, from data in memory, the electric system behavior (for example, maximum, minimum, average voltages, etc.) and analyze tension regulation efficiency.

By the tripped OLTC blocking function, preventing the occurrence of serious undervoltages or overvoltages that may cause forced transformer switching off or damage to loads connected to it.

The "OLTC maintenance assistant" function allows:
Automating OLTC control and number of operations, reducing costs related to traveling to the equipment just to check the current number of operations in mechanical command;
Better maintenance manpower utilization, which avoids spending time manually controlling OLTC maintenance intervals, with consequent cost reduction;
OLTC maintenance lack risk reduction due to human failures in maintenance interval control;
With the maintenance warning issued in advance by the voltage regulation system, better interval adjustment between inspections and/or maintenances occurs, avoiding excessive delays in maintenances caused by lack of logistics preparation for jobs;
Working in conjunction, the several above-listed benefits may allow failures rate reduction in OLTCs, due to interval adjustment and OLTC maintenance quality improvement, taking into consideration that maintenance personnel have their time freed for better preparation for the activity.

Additionally, the "OLTC maintenance assistant" function allows:
Making the OLTC maintenance philosophy transition of maintenance based on time for maintenance modeled on the state of the equipment, avoiding unnecessary OLTC interventions and, consequently, reducing maintenance costs;
OLTC failure risk reduction due to excessive wear of arc interruption contacts; In order to prevent unnecessary OLTC interventions, it reduces the risk of problems caused in it by human failures when intervening for maintenance;
With the maintenance warning issued in advance by the voltage regulation system, maintenances can be prepared in advance to become effective at the ideal time only, preventing excessive delays in maintenances caused by lack of materials and/or lack of logistics preparation for jobs;
Working in conjunction, the several above-listed benefits may allow failures rate reduction in OLTCs, due to knowing the actual state of arc interruption contacts. Furthermore, it improves OLTC maintenance quality, since when preventing unnecessary interventions in OLTC, maintenance professionals have their time freed for better preparation for the activity.

By the smart master-commanded-individual programming, all possibilities for the operator making invalid programming are inhibited, such as more than one transformer as a master, or the existence of commanded transformers without there being a master, or further selecting a transformer as commanded without its tap position being equal to the mater, among other invalid programming possibilities.

By smart "individual bank-phase" programming, possibilities for the operator making invalid programming are inhibited, such as selecting that the transformer OLTC of each phase will operate in individual manner, and consequently in different tap position from the other phases, even if the that transformer bank is in normal operation and electrically connected in parallel to other banks, among other invalid programming possibilities.

By the "correct synchronism and programming signaling" function", preventing the operator from making the mistake of electrically connecting in parallel transformers that are not found in the same tap position.

Next, the invention will be technically explained, by using as a basis block diagrams.

BRIEF DESCRIPTIONS OF THE DRAWINGS

FIG. 4 is a schematic representing a non-volatile memory used in some embodiments of the present invention.

DETAILED DESCRIPTION OF PREFERRED EMBODIMENT

Figure 1:
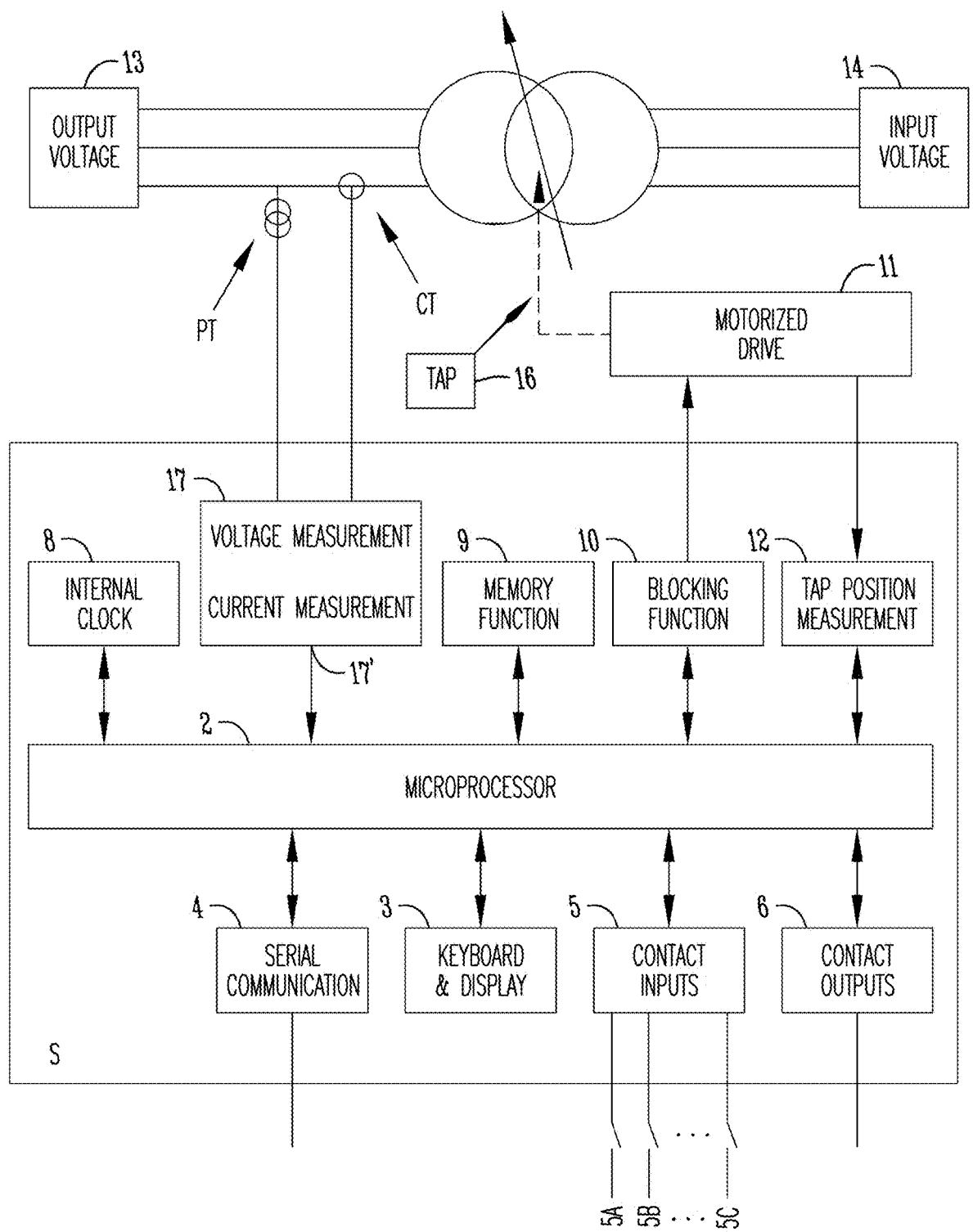
FIG. 1 is a schematic of a voltage regulation system according to one embodiment of the present invention.
Figure 2:
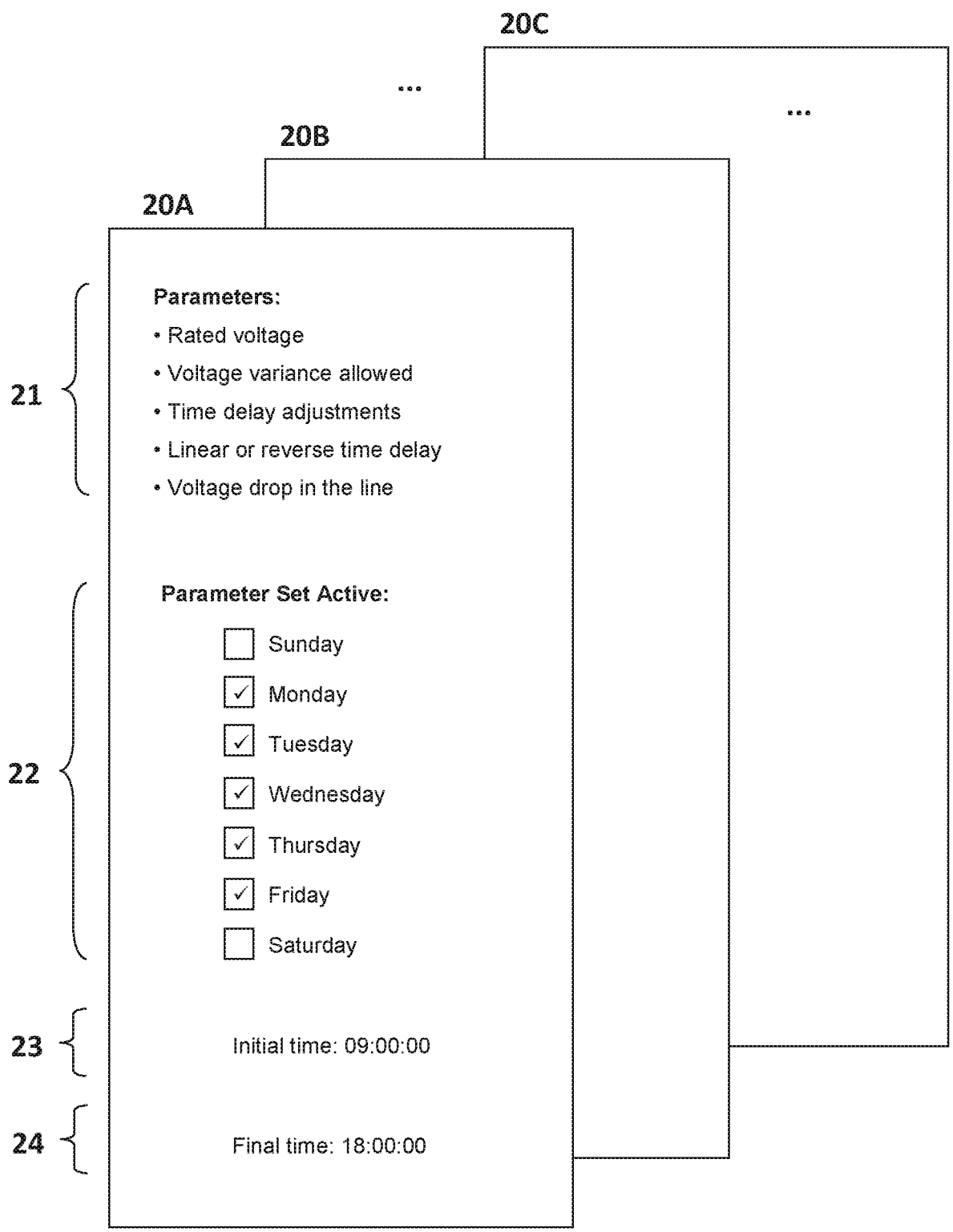
FIG. 2 is schematic showing parameter sets according to one embodiment of the present invention.
Figure 3:
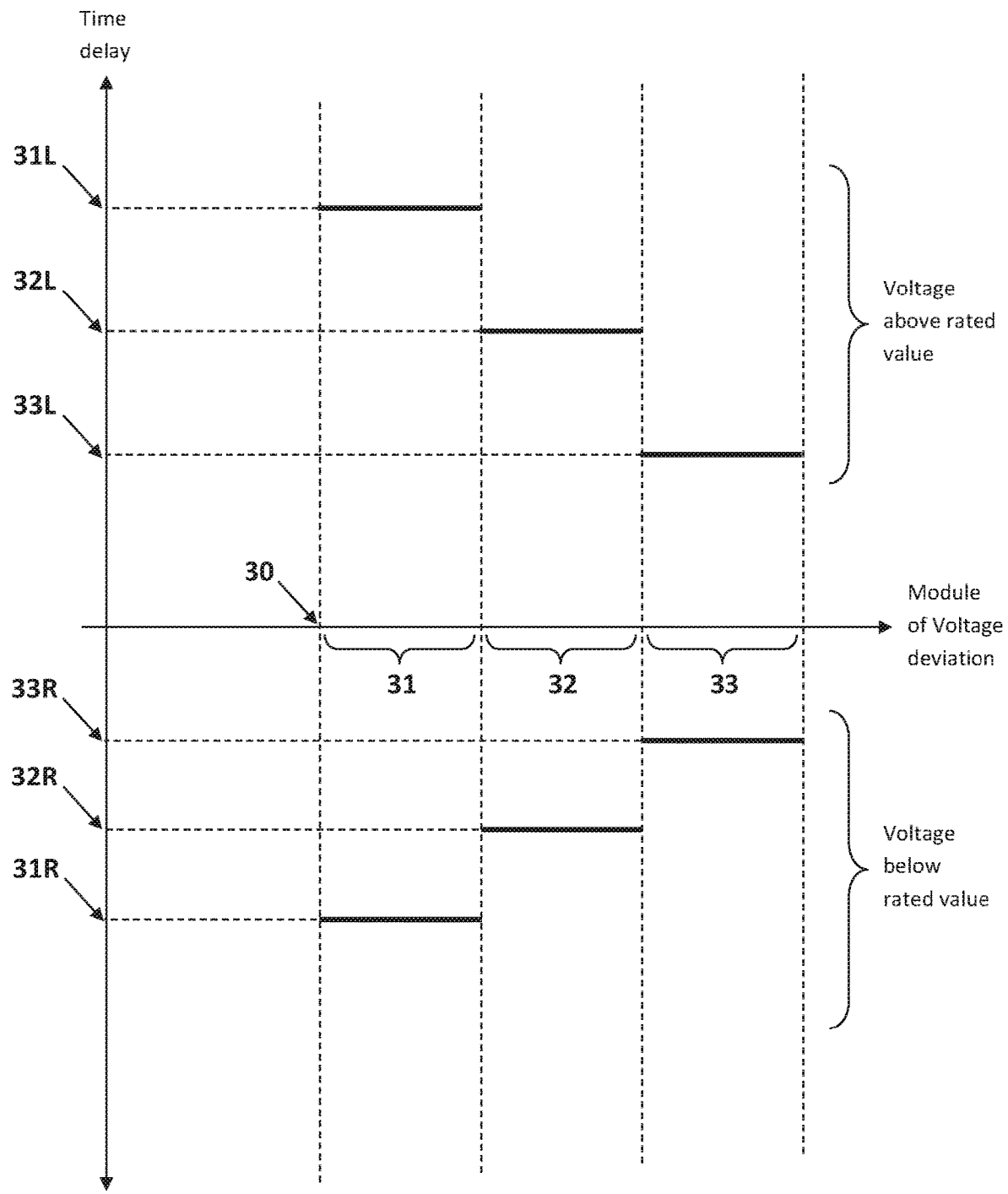
FIG. 3 is a schematic illustrating voltage deviation parameters according to one embodiment of the present invention.

The present invention preferably applies to power transformers (1) and voltage regulators and similar, it being that this system (S) hereinafter referred to as voltage regulation system, by means of a microprocessor (2) provides innovating functions that make up for deficiencies of currently existing voltage relays, highlighting pre-programming, by means of man-machine interface such as, for example, keyboard and display (3), or serial communication (4) of several settings and different voltage regulation parameters, each adequate setting for a certain prevailing load condition, performed by means of dry contact inputs (5), contact outputs (6) being destined for self-diagnosis signaling and alarms (7). Voltage regulation allows parameter selection to be made by means of daily and hourly programming through an internal clock (8). Said system (S) also has the non-volatile memory function (9); OLTC blocking function (10) that directly acts on the motorized drive (11) of the OLTC; tap position measurement (12) with inoperative OLTC detection or release, OLTC maintenance assistant; smart programming and correct synchronism and correct programming function (7).

As already commented, transformers (1) are used in electric power generation, transmission and distribution, usually changing the output voltage value for load (13) in relation to input voltage (14). This is done with windings equipped with taps connected to an Onload Tap Changer (OLTC) (15) that makes tap change with the energized transformer (1) and connected load. Therefore the OLTC has a motorized drive mechanism (11) that obeys input signals to raise and lower the tap (10), In order to perform the voltage regulation function, an output voltage measurement is made (17) by means of a power (PT) and current transformer (17') of load by means of a current transformer (CT), more particularly, proposed regulation system (S) consists of a microprocessor (2) that with said voltage and current measurements (17 and 17') provides new functions and features, making up for deficiencies of currently existing relays that make voltage regulation base on a single parameter set; unlike the applied for system (S) that allows them to be pre-programmed by a man-machine interface such as, for example a keyboard and display (3), or a serial communication (4) several settings for voltage regulation parameters, each setting being adequate for a given prevailing load condition that may be identified by the time informed by the internal clock (8). In order to enable this function, the system (S) proposed herein has six or more regulation parameter sets (20A, 20B, 20C) adjustable in independent manner, each set having the parameters described below:

Desired rated voltage in load;

Voltage variance percentage allowed over and below rated voltage;

Timing adjustment for OLTC (16) actuation in order to correct voltage;

Choice of linear or reverse timing type;

Parameters referring to voltage drops in the line;

According to some aspects of the present disclosure, a selection of a set from the six or more sets (20A, 20B, 20C) of voltage regulation parameters (21) is made by a dry contact input (5), wherein the selection of the set (20A, 20B, 20C) of voltage regulation parameters (21) is determined by a combination of open and closed dry contacts (5A, 5B, 5C) connected to the dry contact input (5). The combination of open and closed dry contacts (5A, 5B, 5C) can be interpreted in a decimal manner, with said dry contacts (5A, 5B, 5C) directly corresponding to a set of voltage regulation parameters (20A, 20B, 20C), such that, when a first dry contact (5A) is closed, a first set of voltage regulation parameters (20A) is selected, and when a second dry contact (5B) is closed, a second set of voltage regulation parameters (20B) is selected. Alternatively, the combination of open and closed dry contacts (5A, 5B, 5C) can be interpreted in a binary manner, with said dry contacts (5A, 5B, 5C) has a corresponding bit assigned the value 0 when the corresponding dry contact is open or 1 when the corresponding dry contact is closed, and wherein a combination of the corresponding bits compose a binary number that, converted to a decimal number, indicates which set (20A, 20B, 20C) of voltage regulation parameters (21) is selected.

According to some other aspects of the present disclosure, the voltage regulation system (S) has several parameters of ranges of voltage deviation (31, 32, 33) in reference to the preprogrammed rated voltage, below and above the preprogrammed rated voltage, and for each range of voltage deviation (31, 32, 33), the voltage regulation system (S) has two parameters of a time delay (21) for OLTC (15) operation, at least one of the voltage deviations (31R, 32R, 33R) to be used when the measured load voltage (13) is below the preprogrammed rated voltage by more than an allowed tolerance margin (30), and the other (31L, 32L, 33L) to be used when the load voltage (13) exceeds the preprogrammed rated voltage by more than the allowed tolerance margin (30); whenever the measured load voltage (13) is below or above the preprogrammed rated voltage by more than the allowed tolerance margin (30), the voltage regulation system (S) compares the load voltage (13) to ranges of voltage deviation (31, 32, 33), determines which one of the ranges of voltage deviation corresponds to the measured load voltage (13) and selects a corresponding time delay parameter (31R, 32R, 33R, 31L, 32L, 33L) for voltage regulation in system (S) operation.

According to yet some other aspects of the present disclosure, a voltage regulation system (S) performs recording of measurements in non-volatile memory (9) according to parameters programmed by a user by means of a man-machine interface, the method comprising: setting a time interval which specifies times for periodic recording; selecting variables (9A) in the non-volatile memory (9), including: a measured voltage (17), a load voltage (13), a load current (17') and an on-load tap changer (OLTC) tap position (12), and calculated variables including: active and reactive power, frequency and load power factor; selecting more than one recording mode (9B) for each of the said variables (9A), the recording modes (9B) being selected from a group including: instantaneous value of the variable, average value of the variable calculated during the time interval, root mean square of the variable calculated during the interval since last recording, maximum value of the variable observed during an interval since last recording or minimum value of the variable observed during the interval since last recording; and recording each of the selected variables (9A) using the selected recording modes (9B) at the set time interval.

According to yet some other aspects of the present disclosure, a voltage regulation system (S) performs an on-load tap changer (OLTC) Maintenance Assistant function by measuring an OLTC tap position measurement through a tap measuring input (12). More particularly, the on-load tap changer (OLTC) Maintenance Assistant function counts a total number of OLTC operations since a beginning of OLTC operation, said total number of OLTC operations being increased every time a OLTC tap position measurement input (12) changes. The on-load tap changer (OLTC) Maintenance Assistant function counts a partial number of OLTC operations since a last maintenance performed on the OLTC, the partial number of OLTC operations being increased every time the OLTC tap position measurement input (12) changes. Both the total and the partial numbers of OLTC operations are increased by one unit every time the OLTC tap position measurement input (12) changes, except for tap positions previously selected and programmed by a user with a specified number to increase both the total number of OLTC operations and the partial number of OLTC operations. Both the total and the partial numbers of OLTC operations are recorded in a voltage regulation system (S) non-volatile memory (9). Both the total and the partial numbers of OLTC operations have values programmed by the user, so as to allow an application of the OLTC Maintenance Assistant function with used OLTCs. the The on-load tap changer (OLTC) Maintenance Assistant function programs a number of operations after which OLTC maintenance must be performed, whereby the voltage regulation system (S) issues a warning indicating a need for OLTC maintenance when the partial number of OLTC operation counting is equal or higher than the number of operations after which OLTC maintenance must be performed. The voltage regulation system (S) calculates an average number of OLTC operations per day by dividing a number of operations in the last X days by X elapsed days, X being a time interval programmable by the user. The voltage regulation system (S) calculates a remaining time for reaching the number of operations after which OLTC maintenance must be performed, according to a formula: Y=((No. of operations for maintenance)−(partial operation counter))/(Average daily operations); wherein the voltage regulation system (S) issues a maintenance warning indicating that OLTC maintenance will be necessary within Y days, when a value calculated for Y is equal or lower than a number of days for advanced maintenance warning programmed by the user. The maintenance warnings will remain active in the voltage regulation system (S) until the user performs a manual warning reset at a keyboard (3), informing the voltage regulation system (S) that maintenance has been performed. Once the manual reset is made, the partial number of OLTC operations since the last maintenance is zeroed and warnings for maintenance are switched off. The method can be used on any of power transformers, voltage regulators, and/or capacitor banks.

According to some additional aspects of the present disclosure, the OLTC Maintenance Assistance function can further feature: each time the OLTC (15) tap position measurement input (12) changes, the voltage regulation system (S) squares a load current measurement to a produce a squared value and adds the squared value to a previous value in a total switched current sum recorder, which is stored in non-volatile memory (9); each time the OLTC (15) tap position measurement (12) changes, the voltage regulation system (S) squares a load current measurement at a time of a tap change to produce a second squared value and adds the second squared value to the value in the partial switched current sum recorder since the last maintenance performed on the OLTC (16), which is stored in non-volatile memory (9) in the voltage regulation system (S); both the total number of OLTC operations and the partial number of OLTC operations have values programmed by the user, so as to allow an application of the OLTC Maintenance Assistant with used OLTCs; issuing a warning with the voltage regulation system (S) indicating a need for OLTC maintenance when the partial number of OLTC operations is equal or higher than a limit value for maintenance based on a preprogrammed limit value for a sum of switched current after which OLTC (15) maintenance must be performed; the voltage regulation system (S) calculates an average per day increment of sum of switched current by dividing an increment in a switched current in a last W days by W elapsed days, W being a time interval programmable by the user; the voltage regulation system (S) calculates a remaining time for reaching a limit value of a sum of the switched current for OLTC maintenance, according to: Z=((Sum value for maintenance)−(partial sum recorder))/(Daily increment average in sum); the voltage regulation system (S) issues a warning indicating that the OLTC maintenance will be necessary within Z days, when Z is equal or lower than a number of days for advanced maintenance warning programmed by the user; and maintenance warnings will remain active in the voltage regulation system (S) until the user performs a manual warning reset at a keyboard (3), informing the voltage regulation system (S) that maintenance has been performed; once a reset is made, the partial number of OLTC operations is set to zero and warnings for maintenance are switched off.

As already mentioned, the voltage regulation system allows selection of the voltage regulation parameter set used in the system operation to be made by means of daily and hourly programming, consisting of the weekdays and time ranges for activating parameter set. For each parameters weekdays (Sunday through Saturday) are selected, in addition to the time range defined by start hour, minute and second, range end hour, minute and second. Within the days and time range selected for a given set it will be used for voltage regulation. In other words, based on its real-time internal clock (8) that keeps day, month, year, weekday, hour, minute and second information and based on performed daily and hourly programming the voltage regulation system makes the choice of the regulation set to be used at current time.

In addition to regulation parameter set selection through a daily/hourly programming, this selection can be made by dry contact input (5). The combination of open and closed contacts in these inputs indicates to the voltage regulation system which parameter set must be used. The combination of open and closed contacts in these inputs can be encoded in decimal manner, that is, each parameter set directly corresponds to an input contact, or can be encoded in binary manner, with the combination of input contact states forming a number corresponding to the respective parameter set.

The proposed voltage regulation system allows independent OLTC timing and performance values to be adjusted for conditions in which voltage is over or below allowed tolerance margins, providing conditions for meeting the sector regulatory agency requirements in relation to allowed times for voltage off tolerance, at the same time as OLTC operation time is reduced to the maximum possible, reducing maintenance costs.

Another proposed system innovation is the adjustment, in addition to the tolerance margin, of several voltage deviation ranges, it being that each deviation range is associated with different OLTC operation times (for each deviation range one time setting for increasing voltage and one setting for reducing voltage).

Such a fact allows the operator to create a customized timing mode, in which operation time diminishes exactly as desired as voltage deviation increases, so as to exactly meet the regulatory agency requirements in relation to allowed times for voltage off tolerance, at the same time as OLTC operation time is reduced to the maximum possible, reducing maintenance costs.

The regulation system proposed herein The system also has the mass memory function, where they are recorded in a non-volatile memory (9), obeying the interval programmed by the operator, measurement values made by the system, it being that this function has the following features: Variables to be recorded can be freely chosen by the operator among all measures or calculated values by the system, such as, measured voltage in transformer, voltage in load, load current, powers, frequency, power factor, OLTC tap position, etc.

For each variable selected for recording by the operator the recording mode can be chosen among the options: instant value (measured value at recording time), arithmetic mean of measurements made since the last recording in memory, square mean of measurements made since the last recording in memory or minimum value of measurements made since the last recording in memory.

One and the same measurement can be selected for recording in memory in several different modes. For example, "voltage in load" variable can be selected for recording with instant value, mean value, maximum value and also minimum value.

In order to prevent certain failures in OLTCs the proposed voltage regulation system has the "tripped OLTC blocking" function, with the following features:

Performance by the voltage regulation system of OLTC tap position measurement (12);

It considers normal OLTC operation the condition in which the voltage regulation system issues a signal to the OLTC to raise or lower tap position (10) and after that the OLTC tap position undergoes a change in the same direction of sent signal (raise or lower the tap);

It considers that the OLTC is tripped if a change in measured OLTC tap (12) occurs without the voltage regulation system having previously sent a signal (10) requesting this change, or further if the voltage regulation system issues a signal for tap change (10) and the OLTC makes a change in the opposite direction to issued signal. In this case an output contact (6) can be programmed by the operator for remote signaling (7) of the occurrence;

In order to prevent false tripped OLTC alarms, due, for example, to tap changes manually requested by the operator directly on the motorized drive panel, it may be programmed in the voltage regulation system to only consider that the OLTC is tripped if several successive tap changes occur, being the number of tap changes for considering that the OLTC is tripped programmed by the operator;

A tripped OLTC situation is detected, as described above, an output contact (10) is activated in the voltage regulation system. This contact can be connected by the operator in order to switch off the OLTC drive motor supply (11), forcing him in this manner to stop tap changes and avoid the consequences such as forced transformer switching off or damage to the load.

In order to allow quick detection of an inoperative changer, before voltage reaches too high or two low values, the voltage regulation system proposed herein has the "Inoperative OLTC detection" function with the following features:

Performance by the voltage regulation system of OLTC tap position measurement (12);

It considers that the OLTC is found in normal condition if the voltage regulation system issues a signal (10) to the OLTC to raise or lower tap position and after that the OLTC tap position undergoes a change in the same direction of sent signal (raise or lower the tap, detected by the OLTC position measurement) within the time period programmed by the operator;

It considers that the OLTC is inoperative if the voltage regulation system issues a signal (10) to the OLTC to raise or lower tap position and, after that the OLTC tap position does not undergo a change within the time period programmed by the operator (the change is detected by measuring the OLTC position);

In order to avoid false inoperative OLTC alarms, such as, for example, during maintenances in which the OLTC is kept inoperative, the operator may enable or disable this function in the voltage regulation system;

When detecting the inoperative OLTC situation, as described above, the condition is signaled through an alarm indication in the voltage regulation system that, may also activate an output contact (6) for remote alarm indication (7);

The alarm indication will remain active in the voltage regulation system and the alarm contact will remain activated until the operator makes a manual alarm reset informing to the system voltage regulation system that he is already aware of the problem.

The operator may also enable the voltage regulation system to make an automatic inoperative OLTC alarm reset, the automatic reset being made as soon as new OLTC tap change attempt is successively made.

A new function of the proposed voltage regulation system is of OLTC Maintenance Assistant, with the following features:

Total OLTC operation number count, since the beginning of its operation, by measuring the OLTC position (12). Every time the measured tap position changes the OLTC operation counter increases the number of required operations for making referred tap change (one operation in most cases, there may also be several operations in case of OLTCs with intermediate positions);

Partial OLTC operation number count since the last inspection or maintenance made by the operator, by measuring the OLTC position (12), in similar manner to above-described total operation number count;

Initial operation numbers of both counters (total and partial) adjustable by the operator, allowing utilization of the OLTC, also in old equipment, in addition to allowing operation count correction in the event of a failure in the voltage regulation system.

A warning indicating that the operation number for OLTC maintenance when partial operation count (since the last maintenance) has exceeded the number of operations for maintenance adjusted by the operator; with the possibility of programming an output relay (6) for remote signaling (7);

OLTC average daily operation count, made by dividing the sum of total operation number in the last X days by the number of X days, X being a time window programmable by the operator between one and three hundred and sixty five days;

Approximate Y remaining time calculation for reaching the number of operations for maintenance, according to the ratio below:

$$Y = \frac{\text{(No. of operations for maintenance)} - \text{(partial operation counter)}}{\text{Average daily operations}}$$

Warning indication that the number of operations for OLTC maintenance will be reached within Y days, when remaining time calculation for Y maintenance is lower than the number of advance days for maintenance warning adjusted by the operator between zero and three hundred and sixty five days, with the possibility of programming an output relay (6) for remote signaling (7);

The maintenance warning indication will remain active in the voltage regulation system and the alarm contact(s) will remain activated until the operator makes a manual warning reset, informing the voltage regulation system that maintenance has already been performed. Once the reset is made, partial operation count since the last maintenance is zeroed and warnings are switched off for maintenance.

In addition to the above-listed the "OLTC maintenance assistant", has further the following features:

Every time a OLTC tap change is made, detected by the tap measurement means (12), the voltage regulation system the load current measurement (17') at the time of tap change and raises it to the power of 2. Obtained value is added to the already existing one in the total changed current sum recorder since the beginning of the OLTC operation, which is kept in a non-volatile memory in the voltage regulation system;

As described above, every time a OLTC tap change is made, detected by means of tap measurement (12), the voltage regulation system takes the load current measurement (17') at the time of the change and raises it to square. Obtained value is also added to the already existing value in another recorder, this one dedicated to the sum of partial change current since the last OLTC maintenance, which is kept in the voltage regulation system non-volatile memory;

Initial values of both changed current sum records (total and partial) adjustable by the operator, allowing using the OLTC maintenance assistant also in old equipment, in addition to allowing sum corrections in the event of a failure in the voltage regulation system;

A warning indication that the changed current sum for OLTC maintenance has been reached when the partial sum record (since the last maintenance) exceeds the sum value for maintenance adjusted by the user, with the possibility of output relay (Se) programming for remote signaling (7);

Daily increment average calculation in the current sum changed by the OLTC, made by dividing the increment in the current sum in the last W days by W number of days, W being a time window programmable by the operator between one and three hundred and sixty five days;

Approximate remaining time Z calculation for reaching sum value for maintenance, according to the formula:

$$Z = \frac{\text{(Sum value for maintence)} - \text{(partial sum recorder)}}{\text{Daily increment average in sum}}$$

A warning indication that the number of operations for OLTC maintenance will be reached within Z days, when remaining time for maintenance Z calculation is lower than the number of advance days for maintenance warning adjusted by user between zero and three hundred and sixty five days, having the possibility of programming the output relay (6) for remote signaling (7);

The maintenance warning indication remains active in the voltage regulation system and alarm contact(s) will remain activated until user makes manual warning reset, informing the voltage regulation system that maintenance has already been performed, Once this reset is made, the partial sum recorder of changed currents since the last maintenance is zeroed and maintenance warnings are switched off.

Proposed system also performs the "smart master-commanded-individual programming" function, with the following features:

Inhibiting the possibility of selecting any transformer as master if there is already any other transformer selected as master. In this event in which there is already a selected master, all other transformers can only be selected as commanded or individual;

Inhibiting the possibility of selecting any transformer as commanded if there is not yet a transformer selected as master. In this event, in which there is not yet a selected master, all other transformers can only be selected as master or individual;

Inhibiting the possibility of changing the programming of the transformer selected as master to commanded or individual if there is one or more transformers selected as commanded, in the way avoiding that there will be transformers in commanded without there being a master.

In addition to what has already been commented above, the "smart master-commanded-individual programming" function has as features, in addition to those already mentioned:

Rejecting the selection change of any transformer from individual mode to commanded mode if its measured tap position (12) is not equal to a master transformer one, avoiding thereby unnecessary alarm issuing due to tap discrepancy;

If it is insisted in the attempt to program a transformer as commanded without its measured tap position (12) being equal to a master transformer one, in addition to rejecting this programming the voltage regulation system will issue an "invalid parallelism programming" alarm, warning the operator about the situation, with output relay programming possibility (6) for remote signaling (7);

Proposed system also performs the "smart bank-individual phase programming" function, with the following features:

Inhibiting the possibility of selecting any phase of a single-phase transformer bank for operation in the "individual phase" mode if the bank is selected for operation in parallel with other banks, that is, if the bank is selected in master or commanded mode.

Inhibiting the possibility of selecting any phase of a single-phase transformer bank for operation in the "individual phase" mode if the bank is selected for operation in automatic mode, that is, with OLTCs being controlled according to load voltage and current measurements.

Only allowing selecting one of the phases of a single-phase transformer bank for operation in "individual phase" mode if the bank is selected for operation in individual and manual mode.

Automatically changing any phase of a single-phase transformer bank that is selected for operation in "individual phase" mode to "bank" mode if the bank is selected for operation in master, commanded or automatic mode.

In addition to what has already been commented above, the "smart bank-individual phase programming" function has as features, in addition to those already mentioned:

Rejecting the selection change of any phase of a transformer from "individual phase" mode to "bank" mode if its tap position is not equal to phase A one, adopted as a reference, avoiding thereby unnecessary alarm issuing due to tap discrepancy. If it is insisted in the attempt to program a phase in the "bank" mode transformer without its tap position being equal to phase A one, in addition to rejecting this programming the voltage regulation system will issue an "invalid parallelism programming" alarm, warning the operator about the situation;

Proposed system also performs the "correct synchronism and programming signaling" function, with the following features:

In transformers selected in individual mode no correct synchronism and programming signaling is issued (since there is no, in this case, commitment to keep tap position equal to master transformer position);

In each transformer selected in commanded mode it is signaled that synchronism and programming are correct only if transformer tap position (12) is equal to master tap position and if current individual master-commanded situation is valid (there is only one master transformer);

In selected transformer is master mode it is always signaled that synchronism and programming are correct, because tap position of this transformer as taken as a reference for selected transformers as commanded and is considered correct by default.

The main usefulness of the above-mentioned function, with above-described features is to serve as a permission signal for closing the circuit breaker that connects the winding of each transformer in parallel with the other, allowing automating the synchronism check function before connection in parallel, which is currently done in manual manner. To that end, correct synchronism and programming signaling can be made by means of a serial communication network (4) or further by activating an output contact (6) for each transformer.

The invention claimed is:

1. A method for voltage regulation, control, protection, and condition monitoring for on-load tap changers of power transformers, voltage regulators, and capacitor banks comprising:
   using a voltage regulation system (S) comprising six or more sets (20A, 20B, 20C) of voltage regulation parameters (21) with a combination of open and closed dry contact (5A, 5B, 5C) connected to a dry set at an entrance of contact (5); and
   independently adjusting, with the voltage regulation system (S), each of said sets (20A, 20B, 20C) for a given prevailing load (L) condition;

interpreting the combination of oven and closed dry contacts (5A, 5B, 5C) in a decimal manner with said dry contacts (5A, 5B, 5C) corresponding directly to a set of voltage regulation parameters (20A, 20B, 20C) so that when a first dry contact (5A) is closed a first set of voltage regulation parameters (20A) is selected and when a second dry contact (5B) is closed a second set of voltage regulation parameters (20B) selected:

the voltage regulation parameters (21) comprise a desired rated voltage at a load;

a percentage of voltage variance allowed above and below a desired nominal voltage;

time delay adjustments for actuation of an on-load tap changer (OLTC) (16) in order to correct voltage at the load;

choice of a type of linear or reverse delay; and voltage drop parameters.

2. The method of claim 1 further comprising interpreting the combination of open and closed dry contacts (5A, 5B, 5C) in a binary manner, with said dry contacts (5A, 5B, 5C) having a corresponding bit assigned a value 0 when a corresponding dry contact is open or a value 1 when the corresponding dry contact is closed, and wherein a combination of the corresponding bits compose a binary number that, converted to a decimal number, indicates which set (20A, 20B, 20C) of voltage regulation parameters (21) is selected.

3. The method of claim 1 wherein a selection of a set from the six or more sets (20A, 20B, 20C) of voltage regulation parameters (21) is accomplished by programming by a user, such programming comprising weekdays (22) and time ranges (23, 24) for activating each set (20A, 20B, 20C) of parameters; for each set of parameters (20A, 20B, 20C) days are selected, as well as a time range defined by an initial hour, minute and second (23) and a final hour, minute and second (24); when a weekday indicated by a real-time clock (8) corresponds to one of the days selected to a first set of parameters (20A, 20B, 20C) and a present time indicated by the real-time clock (8) is within the time range (23, 24) selected to the first set of parameters (20A, 20B, 20C), wherein the first set of parameters (20A, 20B, 20C) is then selected for use by the voltage regulation system (S).

4. A method for voltage regulation, control, protection and monitoring of state of on-load tap changers of power transformers, voltage regulators, and capacitor banks comprising:

whenever a measured load voltage (13) is below or above a preprogrammed rated voltage by more than an allowed tolerance margin (30):

comparing, with a voltage regulation system (S), the measured load voltage (13) to ranges of voltage deviation (31, 32, 33);

determining, with a voltage regulation system (S), which one of the ranges of voltage deviation corresponds to the measured load voltage (13);

wherein the voltage regulation system (S) has several voltage deviation range parameters (31, 32, 33) which are below and above the preprogrammed nominal voltage the voltage regulation system (S) has two time delay parameters (21) for OLTC operation (15), at least one of the voltage deviations (31R, 32R, 33R) to be used when the measured load voltage (13) is below the pre-programmed nominal voltage greater than one allowable tolerance range (30) and the other voltage deviations (31L, 32L, 33L) to be used when the load voltage (13) exceeds the preprogrammed nominal voltage by more than the allowable margin tolerance (30).

5. A method for voltage regulation, control, protection and monitoring of state of on-load tap changers of power transformers, voltage regulators, and capacitor banks comprising:

recording, with a voltage regulation system (S), measurements in non-volatile memory (9)

according to parameters programmed by a user by means of a man-machine interface, the method comprising:

setting a time interval which specifies times for periodic recording;

selecting variables (9A) in the non-volatile memory (9), including: a measured voltage (17), a load voltage (13), a load current (17') and an on-load tap changer (OLTC) tap position (12), and calculated variables including: active and reactive power, frequency and load power factor;

selecting more than one recording mode (9B) for each of the said variables (9A), the recording modes (9B) being selected from a group including: instantaneous value of the variable, average value of the variable calculated during the time interval, root mean square of the variable calculated during the interval since last recording, maximum value of the variable observed during an interval since last recording or minimum value of the variable observed during the interval since last recording; and recording each of the selected variables (9A) using the selected recording modes (9B) at the set time interval.

6. A method for voltage regulation, control, protection and monitoring of state of on-load tap changers (OLTC) of power transformers, voltage regulators, and capacitor banks comprising:

measuring, with a voltage regulation system (S), an OLTC tap position measurement through a tap measuring input (12) by:

counting a total number of OLTC operations since a beginning of OLTC operation, the total number of OLTC operations being increased every time a OLTC tap position measurement input (12) changes;

counting a partial number of OLTC operations since a last maintenance performed on the OLTC, the partial number of OLTC operations being increased every time the OLTC tap position measurement input (12) changes;

increasing both the total and the partial numbers of OLTC operations by one unit every time the OLTC tap position measurement input (12) changes, except for tap positions previously selected and programmed by a user with a specified number to increase both the total number of OLTC operations and the partial number of OLTC operations;

recording both the total and the partial numbers of OLTC operations in a voltage regulation system (S) non-volatile memory (9);

allowing the total and the partial numbers of OLTC operations to have values programmed by the user, programming a number of operations after which OLTC maintenance must be performed, whereby the voltage regulation system (S) issues a warning indicating a need for OLTC maintenance when the partial number of OLTC operation counting is equal or higher than a number of operations after which OLTC maintenance must be performed;

calculating, with the voltage regulation system (S), an average number of OLTC operations per day by dividing a number of operations in a last X days by X elapsed days, X being a time interval programmable by the user;

calculating, with the voltage regulation system (S), a remaining time for reaching the number of operations after which OLTC maintenance must be performed, according to a formula:

Y=((No. of operations for maintenance)−(partial operation counter))/(Average daily operations);

issuing, with the voltage regulation system (S), a maintenance warning indicating that OLTC maintenance will be necessary within Y days, when a value calculated for Y is equal or lower than a number of days for advanced maintenance warning programmed by the user; and allowing the maintenance warnings to remain active in the voltage regulation system (S) until the user performs a manual warning reset at a keyboard (3), informing the voltage regulation system (S) that maintenance has been performed; once the manual warning reset is made, the partial number of OLTC operations since the last maintenance is zeroed and warnings for maintenance are switched off.

7. The method of claim 6 further comprising:

with the voltage regulation system (S), performing an OLTC Maintenance Assistant function by measuring the OLTC tap position through the tap measuring input (12) and a load current (17'), wherein:

each time the OLTC tap position measurement input (12) changes, the voltage regulation system (S) squares a load current measurement to produce a squared value and adds the squared value to a previous value in a total switched current sum recorder, which is stored in non-volatile memory (9);

each time the OLTC tap position measurement (12) changes, the voltage regulation system (S) squares a load current measurement at a time of a tap change to produce a second squared value and adds the second squared value to the value in the partial switched current sum recorder since the last maintenance performed on the OLTC, which is stored in non-volatile memory (9) in the voltage regulation system (S);

both the total number of OLTC operations and the partial number of OLTC operations have values programmed by the user, issuing a warning with the voltage regulation system (S) indicating a need for OLTC maintenance when the partial number of OLTC operations is equal or higher than a limit value for maintenance based on a preprogrammed limit value for a sum of switched current after which OLTC maintenance must be performed;

the voltage regulation system (S) calculates an average per day increment of sum of switched current by dividing an increment in a switched current in a last W days by W elapsed days, W being a time interval programmable by the user;

the voltage regulation system (S) calculates a remaining time for reaching a limit value of a sum of the switched current for OLTC maintenance, according to:

Z=((Sum value for maintenance)−(partial sum recorder))/(Daily increment average in sum)

the voltage regulation system (S) issues a warning indicating that the OLTC maintenance will be necessary within Z days, when Z is equal or lower than a number of days for advanced maintenance warning programmed by the user; and allowing maintenance warnings to remain active in the voltage regulation system (S) until the user performs a manual warning reset at a keyboard (3), informing the voltage regulation system (S) that maintenance has been performed; once a reset is made, the partial number of OLTC operations is set to zero and warnings for maintenance are switched off.

* * * * *